(12) United States Patent
Thayamballi et al.

(10) Patent No.: US 8,441,909 B1
(45) Date of Patent: May 14, 2013

(54) DISK DRIVE INCREASING LASER POWER AT BEGINNING OF WRITE IN HEAT ASSISTED MAGNETIC RECORDING

(75) Inventors: Pradeep K. Thayamballi, Fremont, CA (US); Wentao Yan, Fremont, CA (US); Matthew R. Gibbons, San Jose, CA (US); Dennis W. Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/418,843

(22) Filed: Mar. 13, 2012

(51) Int. Cl.
*G11B 7/00* (2006.01)
*G11B 11/00* (2006.01)

(52) U.S. Cl.
USPC .............................................. 369/116; 360/59

(58) Field of Classification Search .................. 369/120, 369/121, 122, 47.5, 47.51, 47.52, 13.14, 369/116; 360/59
See application file for complete search history.

(56) References Cited

U.S. PATENT DOCUMENTS

| | | | |
|---|---|---|---|
| 5,392,273 A | 2/1995 | Masaki et al. | |
| 5,805,559 A | 9/1998 | Murakami et al. | |
| 6,046,970 A | 4/2000 | DeCusatis et al. | |
| 6,359,433 B1 | 3/2002 | Gillis et al. | |
| 6,636,460 B2 | 10/2003 | Akiyama et al. | |
| 6,771,440 B2 | 8/2004 | Smith | |
| 6,950,260 B2 | 9/2005 | Coffey et al. | |
| 6,975,472 B2 | 12/2005 | Stover et al. | |
| 7,023,647 B2 | 4/2006 | Bloodworth et al. | |
| 7,095,577 B1 | 8/2006 | Codilian et al. | |
| 7,099,097 B2 | 8/2006 | Hamaguchi et al. | |
| 7,161,882 B2 | 1/2007 | Lehr et al. | |
| 7,177,253 B2 | 2/2007 | Ishibashi et al. | |
| 7,324,299 B1 | 1/2008 | Schreck et al. | |
| 7,400,473 B1 | 7/2008 | Krajnovich et al. | |
| 7,412,143 B2 | 8/2008 | Rottmayer et al. | |
| 7,502,205 B1 | 3/2009 | Hurtado et al. | |
| 7,724,470 B2 | 5/2010 | Poon et al. | |
| 7,791,986 B2 * | 9/2010 | Koyama et al. | ............ 369/44.23 |
| 7,876,655 B2 | 1/2011 | Sasaki | |
| 7,898,759 B2 | 3/2011 | Matsumoto et al. | |
| 7,990,647 B2 | 8/2011 | Lille | |
| 7,995,425 B2 | 8/2011 | Schreck et al. | |
| 2002/0136115 A1 | 9/2002 | Kadlec et al. | |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

*Primary Examiner* — Nabil Hindi

(57) ABSTRACT

A disk drive is disclosed comprising a disk comprising a plurality of data tracks, wherein each data track comprises a plurality of data sectors. A head is actuated over the disk, wherein the head comprises a laser operable to heat the disk while writing data to the disk. When a write command is received to write data to a target data sector of a target data track, the head is positioned over the target data track. When the head reaches the target data sector, a power applied to the laser is increased to above a steady state value to compensate for a high fly height of the head. The power applied to the laser is decreased toward the steady state value while writing at least part of the data to the target data sector.

20 Claims, 4 Drawing Sheets

U.S. PATENT DOCUMENTS

| | | |
|---|---|---|
| 2006/0233061 A1 | 10/2006 | Rausch et al. |
| 2007/0014041 A1 | 1/2007 | Lille et al. |
| 2007/0230012 A1 | 10/2007 | Erden et al. |
| 2008/0158730 A1 | 7/2008 | Furukawa et al. |
| 2009/0207519 A1 | 8/2009 | Erden et al. |
| 2009/0225464 A1 | 9/2009 | Juang et al. |
| 2009/0251828 A1 | 10/2009 | Schreck et al. |
| 2009/0303629 A1 | 12/2009 | Nakano et al. |
| 2010/0123967 A1 | 5/2010 | Batra et al. |

OTHER PUBLICATIONS

Patrick Gale, "Estimating Laser Diode Lifetimes and Activation Energy", ILX Lightwave Application Note 33, 2008, http://www.ilxlightwave.com/appnotes/AN%2033%20REV01%20Estimating%20Laser%20Diode%20Lifetimes%20&%20Activation%20Energy.pdf.

* cited by examiner

US 8,441,909 B1

DISK DRIVE INCREASING LASER POWER AT BEGINNING OF WRITE IN HEAT ASSISTED MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

DETAILED DESCRIPTION

Figure 1A:
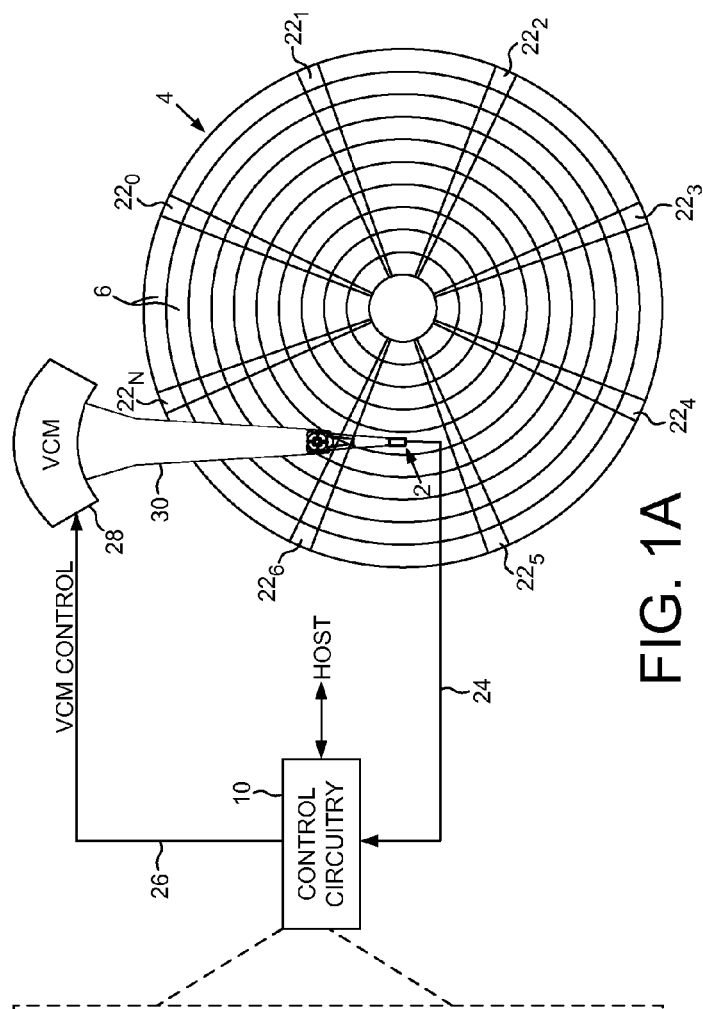
FIG. 1A shows a disk drive according to an embodiment of the present invention comprising a head actuated over a disk.
Figure 1B:
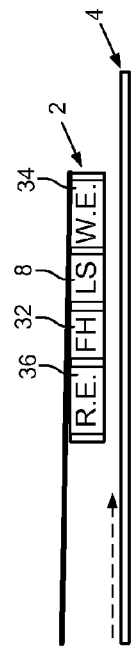
FIG. 1B shows an embodiment of the present invention wherein the head comprises a laser operable to heat the disk while writing data to the disk and a fly height actuator operable to adjust a fly height of the head over the disk.
Figure 1C:
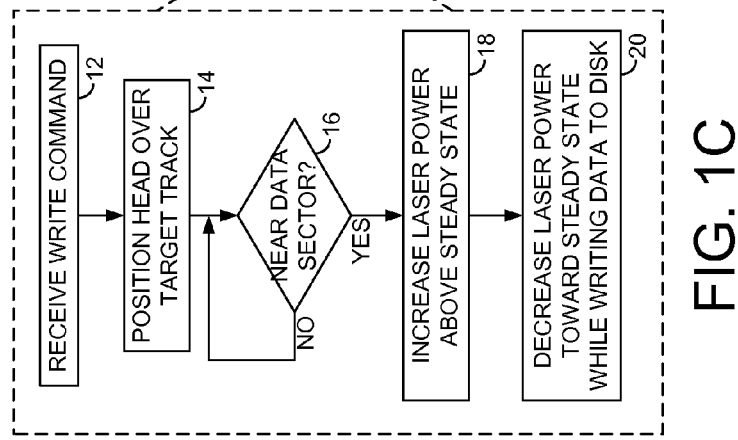
FIG. 1C is a flow diagram according to an embodiment of the present invention wherein the power applied to the laser is increased at the beginning of a write operation and then decreased toward a steady state value.

FIG. 1A shows a disk drive according to an embodiment of the present invention comprising a head 2 actuated over a disk 4 comprising a plurality of data tracks 6, wherein each data track comprises a plurality of data sectors. FIG. 1B shows an embodiment wherein the head 2 comprises a laser 8 operable to heat the disk 4 while writing data to the disk 4. The disk drive further comprises control circuitry 10 operable to execute the flow diagram of FIG. 1C wherein when a write command is received to write data to a target data sector of a target data track (block 12), the head is positioned over the target data track (block 14). When the head reaches the target data sector (block 16), a power applied to the laser is increased to above a steady state value to compensate for a high fly height of the head (block 18). The power applied to the laser is decreased toward the steady state value while writing at least part of the data to the target data sector (block 20).

In the embodiment of FIG. 1A, the data tracks 6 are defined by servo sectors $22_0$-$22_N$ recorded in servo wedges around the circumference of the disk 4. The control circuitry 10 processes a read signal 24 emanating from the head 2 to read the servo sectors $22_0$-$22_N$ and generate a position error signal (PES) representing a position of the head 2 relative to the data tracks 6. The control circuitry 10 comprises a suitable servo compensator which filters the PES to generate a control signal 26 applied to a voice coil motor (VCM) 28. The VCM 28 rotates an actuator arm 30 about a pivot in response to the control signal 26 in order to move the head 2 radially over the disk 4 in a direction that reduces the PES.

In the embodiment of FIG. 1B, the head 2 comprises a fly height actuator 32 operable to control a fly height of the head 2 over the disk 4. For example, the fly height of the head 2 may be controlled to a target fly height that provides optimal performance during write and read operations. Any suitable fly height actuator 32 may be employed in the embodiments of the present invention, such as a heater which controls the fly height through thermal expansion, or a piezoelectric (PZT) actuator which may deflect toward the disk when energized (e.g., with a driving voltage). When not performing write/read operations, the fly height actuator 32 may be controlled to increase the fly height of the head so as to avoid collisions with asperities on the disk.

Any suitable laser 8 may be employed in the embodiments of the present invention, such as a laser diode. In addition, embodiments of the present invention may employ any suitable techniques for focusing the laser 8 on the disk 4, such as a suitable waveguide, magnifying lens, or other suitable elements. Also in the embodiment of FIG. 1B, the head 2 comprises a write element 34 (e.g., an inductive coil) and a read element 36 (e.g., a magnetoresistive read element). During write operations the power applied to the laser 8 is increased in order to heat the disk 4, thereby decreasing the coercivity so that the data is written more reliably. The write power of the laser 8 may be calibrated periodically to ensure optimal heating over the life of the disk drive, and because the laser's output may degrade over time.

Figure 2A:
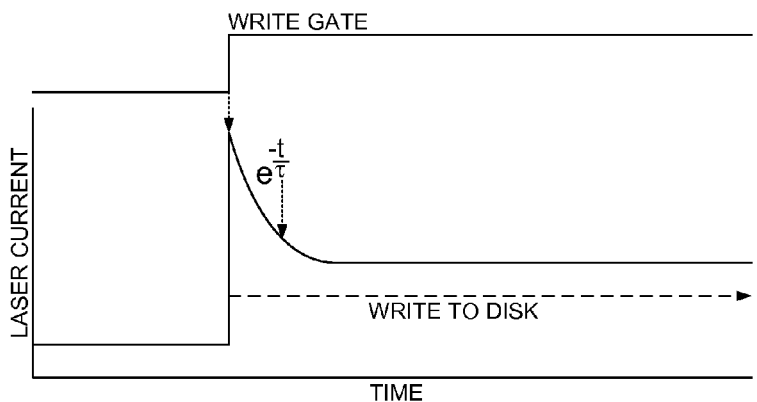
FIGS. 2A-2C show an embodiment of the present invention wherein the power applied to the laser is increased at the beginning of a write operation, and then decreased based on an exponential function that compensates for a high fly height of the head at the end of a pre-heat interval.
Figure 2B:
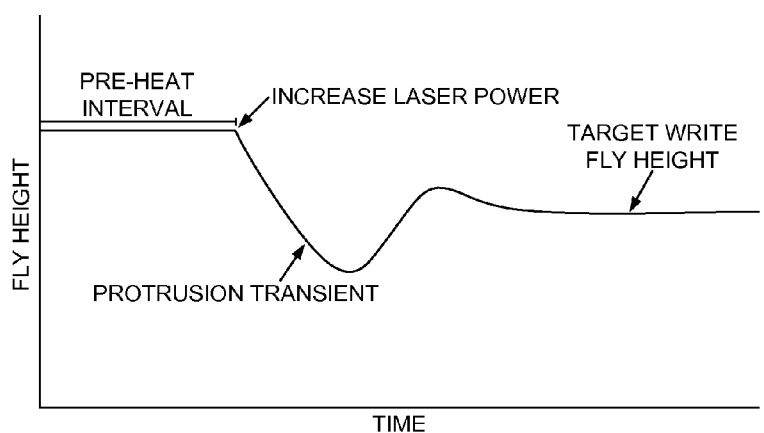

When the power applied to the laser is increased at the beginning of a write operation the resulting heating effect causes a protrusion transient of the head 2 toward the disk 4 as illustrated in FIG. 2B. To prevent the head 2 from colliding with the disk 4 due to this protrusion transient, the fly height of the head is adjusted to be higher than the target write fly height prior to increasing the laser power. In the embodiment of FIG. 2B, this is accomplished by controlling the power applied to the fly height actuator 32 during a pre-heat interval to achieve a high fly height. However, the higher fly height at the beginning of the write operation may decrease the reliability of the data written to the disk. Accordingly, in one embodiment the power applied to the laser at the beginning of a write operation is increased to compensate for the high fly height, and the power is then decreased toward a steady state level as the fly height decreases to the target write fly height as illustrated in FIGS. 2A and 2B.

In the embodiment of FIG. 2A, the power applied to the laser is decreased based on at least one exponential function that establishes a time constant for the decreasing power. Other embodiments may employ a combination of exponentials in order to generate the function that decreases the laser power as the fly height of the head decreases. In one embodiment, the control circuitry 10 is operable to adjust at least one parameter of the exponential function(s) in order to adjust the time constant of the decreasing laser power.

In the embodiment of FIG. 2A, data is written to the disk substantially simultaneous with increasing the power applied to the laser at the beginning of a write operation. In another embodiment, the data writing may be delayed until the fly height decreases to an acceptable level. In this embodiment, increasing the laser power as shown in FIG. 2A may also be delayed until the data writing actually begins. For example, the laser power may be increased to the steady state level at the beginning of a write operation in order to induce the protrusion transient without writing data to the disk. When the fly height decreases sufficiently, the laser power may be increased as shown in FIG. 2A while simultaneously starting to write data to the disk. The laser power may then be decreased (e.g., exponentially) as the fly height decreases to the target write fly height. In this embodiment, the laser power may be increased to a lower level corresponding to the delay in writing and the decreased fly height (i.e., the exponential shown in FIG. 2A may have a smaller amplitude corresponding to the decreased fly height when the data writing begins).

Figure 2C:
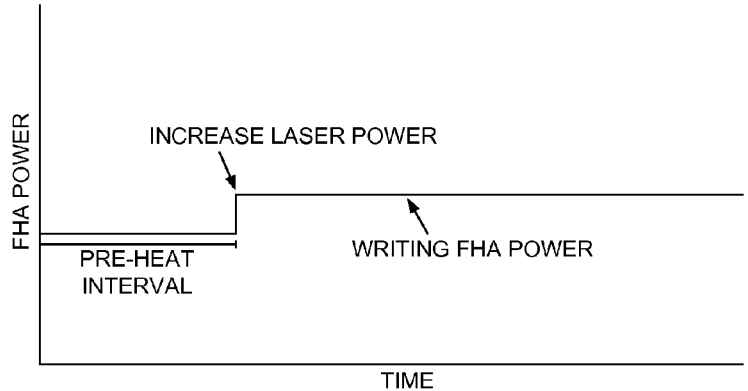

FIG. 2C shows an example power applied to the fly height actuator 32 corresponding to FIG. 2B. The fly height actuator 32 is controlled during a pre-heat interval to adjust the fly height of the head 2, and in one embodiment, the fly height is adjusted during the pre-heat interval to a target fly height that is higher than that used during the write operation as illustrated in FIG. 2B. When the laser power is increased and the write current applied to the write element 34, the power applied to the fly height actuator 32 is adjusted to account for the heating effect of the laser 8 and the write current. That is, the heating caused by the laser 8 and the write current may cause a thermal expansion of the head toward the disk, and therefore the steady state power applied to the fly height actuator 32 while writing data to the disk may be adjusted accordingly.

Figure 3A:
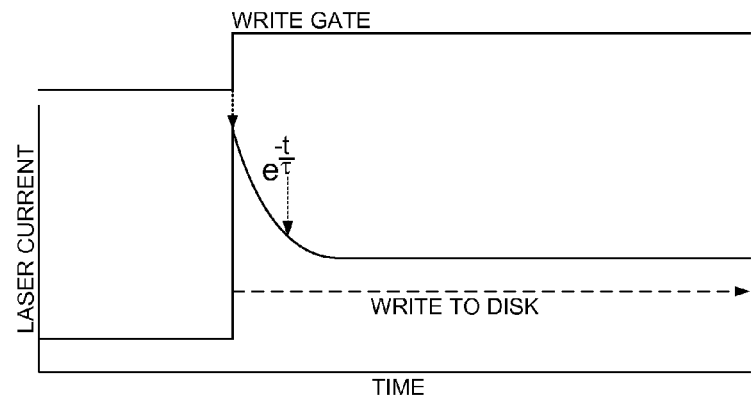
FIGS. 3A-3C show an embodiment of the present invention wherein the power applied to the laser is increased at the beginning of a write operation, and then decreased based on an exponential function that compensates for a high fly height of the head at the end of a pre-laser interval.
Figure 3B:
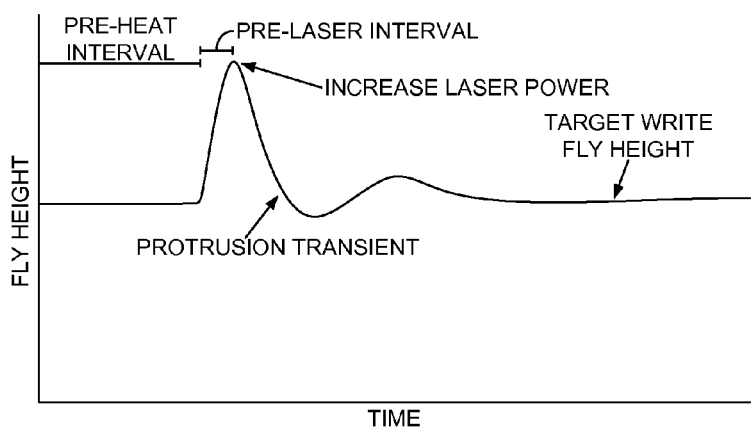
Figure 3C:
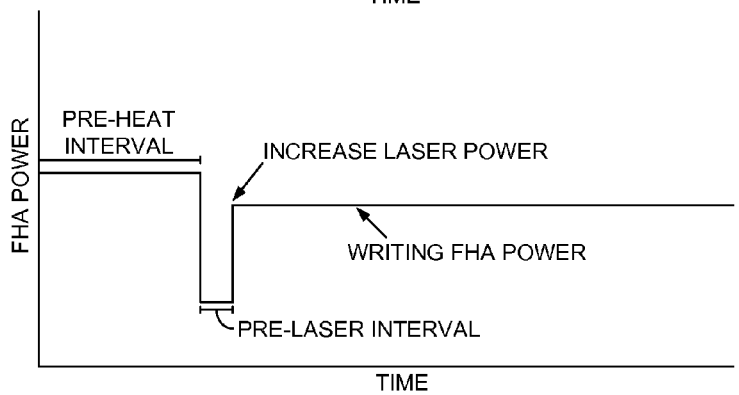

FIGS. 3A-3C illustrate another embodiment of the present invention wherein the fly height actuator 32 is controlled to increase the fly height of the head during a pre-laser interval prior to increasing the laser power at the beginning of a write operation. This is illustrated in FIG. 3B wherein in one embodiment the fly height increases according to a time constant of the fly height actuator 32. FIG. 3C shows a corresponding power applied to the fly height actuator 32 wherein in this embodiment the fly height of the head is increased by decreasing the power applied to the fly height actuator 32 using a step function (although the power may be decreased using any suitable function). At the end of the pre-laser interval, the fly height actuator 32 is controlled by applying a power that maintains a target write fly height during the write operation, including to account for the heating effect of the laser 10 and write current. Increasing the fly height of the head during the pre-laser interval compensates for the protrusion transient of the head toward the disk when the laser power is increased as illustrated in FIG. 3B. To compensate for the high fly height of the head at the beginning of the write operation, the laser power is increased initially and then decreased as the fly height decreases as illustrated in FIG. 3A. The function shown in FIG. 3A may differ from the function shown in FIG. 2A due to the different technique used to compensate for the protrusion transient.

In the embodiment of FIG. 3B, the fly height actuator 32 is controlled during the pre-heat interval to adjust the fly height of the head to the target fly height used during the write operation. In other embodiments, the fly height actuator 32 may adjust the fly height of the head during the pre-heat interval to a level different from the target fly height used during the write operation. For example, the fly height during the pre-heat interval may be higher than the target fly height during the write operation, with a corresponding adjustment to the pre-laser interval, the function that controls the fly height actuator 32 during the pre-laser interval, and/or the function that decreases the laser power as the fly height decreases.

Figure 4:
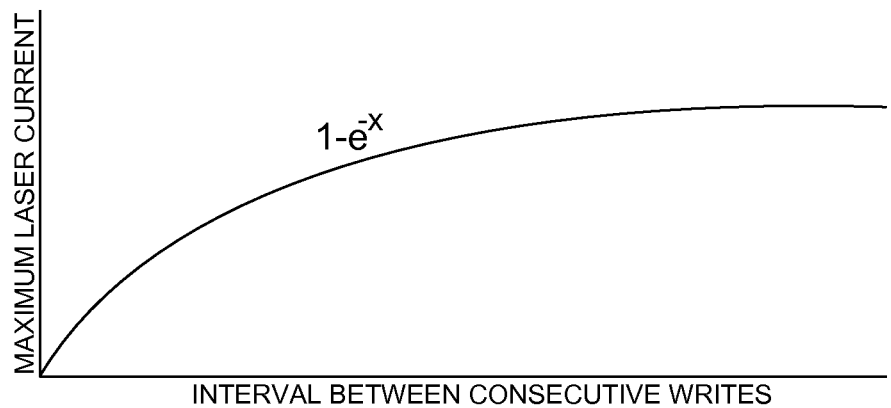
FIG. 4 shows an embodiment of the present invention wherein the power applied to the laser is increased at the beginning of a write operation to a level based on an interval between consecutive writes to the disk.

FIG. 4 shows an embodiment of the present invention wherein the control circuitry 10 is operable to increase the power applied to the laser to a level based on an interval between consecutive writes to the disk 4. In the embodiment of FIG. 4, the control circuitry 10 is operable to select the level based on at least one exponential function having the interval (x) as a parameter of the function. Other embodiments may employ a combination of exponentials to determine the level to increase the laser power based on the interval between consecutive writes to the disk 4.

Figure 5:
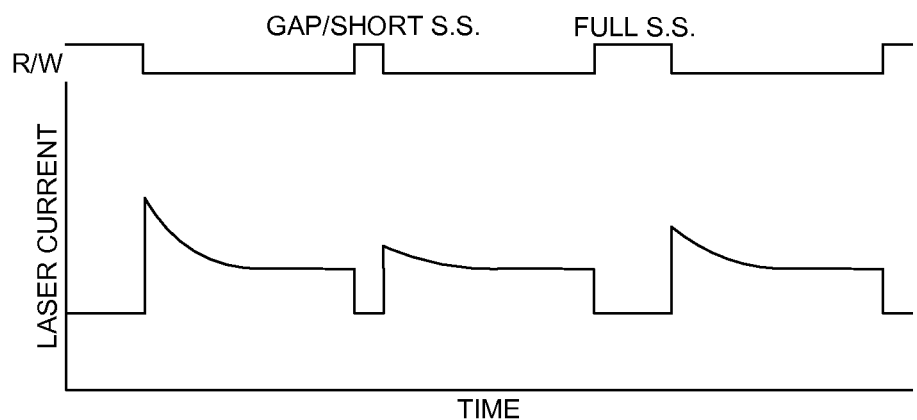
FIG. 5 shows an embodiment of the present invention wherein an interval between consecutive writes may correspond to a gap between consecutive data sectors, a short servo sector, or a full servo sector.

FIG. 5 shows examples of different intervals between consecutive writes to the disk, and the corresponding level to increase the laser power. A short interval due, for example, to a gap between data sectors or a short servo sector (having a shortened track address) requires a smaller increase in the laser power, whereas a longer interval due, for example, to a full servo sector requires a larger increase in the laser power as shown in FIG. 5.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks, wherein each data track comprises a plurality of data sectors;
   a head actuated over the disk, wherein the head comprises a laser operable to heat the disk while writing data to the disk; and control circuitry operable to:
receive a write command to write data to a target data sector of a target data track;
position the head over the target data track;
when the head reaches the target data sector, increase a power applied to the laser to above a steady state value to compensate for a high fly height of the head; and
decrease the power applied to the laser toward the steady state value while writing at least part of the data to the target data sector.

2. The disk drive as recited in claim 1, wherein the power applied to the laser is decreased as the fly height decreases.

3. The disk drive as recited in claim 1, wherein the control circuitry is operable to decrease the power applied to the laser based on at least one exponential function that establishes a time constant for the decreasing power.

4. The disk drive as recited in claim 3, wherein the control circuitry is operable to adjust at least one parameter of the exponential function in order to adjust the time constant.

5. The disk drive as recited in claim 1, wherein the control circuitry is operable to begin writing the data to the target data sector substantially simultaneous with increasing the power applied to the laser.

6. The disk drive as recited in claim 1, wherein the control circuitry is operable to delay writing the data to the target data sector after increasing the power applied to the laser.

7. The disk drive as recited in claim 1, wherein the control circuitry is operable to increase the power applied to the laser to a level based on an interval between consecutive writes to the disk.

8. The disk drive as recited in claim 7, wherein the interval corresponds to a time needed to read a servo sector during a write operation.

9. The disk drive as recited in claim 7, wherein the interval corresponds to a gap between consecutive data sectors during a write operation.

10. The disk drive as recited in claim 7, wherein the control circuitry is operable to select the level based on at least one exponential function having the interval as a parameter of the function.

11. A method of operating a disk drive, the disk drive comprising a disk comprising a plurality of data tracks, wherein each data track comprises a plurality of data sectors, and a head actuated over the disk, wherein the head comprises a laser operable to heat the disk while writing data to the disk, the method comprising:
receiving a write command to write data to a target data sector of a target data track;
positioning the head over the target data track;
when the head reaches the target data sector, increasing a power applied to the laser to above a steady state value to compensate for a high fly height of the head; and
decreasing the power applied to the laser toward the steady state value while writing at least part of the data to the target data sector.

12. The method as recited in claim 11, further comprising decreasing the power applied to the laser as the fly height decreases.

13. The method as recited in claim 11, further comprising decreasing the power applied to the laser based on at least one exponential function that establishes a time constant for the decreasing power.

14. The method as recited in claim 13, further comprising adjusting at least one parameter of the exponential function in order to adjust the time constant.

15. The method as recited in claim 11, further comprising beginning the writing of the data to the target data sector substantially simultaneous with increasing the power applied to the laser.

16. The method as recited in claim 11, further comprising delaying the writing of the data to the target data sector after increasing the power applied to the laser.

17. The method as recited in claim 11, further comprising increasing the power applied to the laser to a level based on an interval between consecutive writes to the disk.

18. The method as recited in claim 17, wherein the interval corresponds to a time needed to read a servo sector during a write operation.

19. The method as recited in claim 17, wherein the interval corresponds to a gap between consecutive data sectors during a write operation.

20. The method as recited in claim 17, further comprising selecting the level based on at least one exponential function having the interval as a parameter of the function.

* * * * *